United States Patent [19]

Kanei

[11] 4,340,004
[45] Jul. 20, 1982

[54] HIGH-SPEED SHIP

[76] Inventor: Yutaka Kanei, 15-3, Tsushimaenishi-machi, Neyagawa, Osaka, Japan, 572

[21] Appl. No.: 891,120

[22] Filed: Mar. 28, 1978

[30] Foreign Application Priority Data

Mar. 30, 1977 [JP] Japan ............................ 52-36778
Nov. 26, 1977 [JP] Japan ............................ 52-141908

[51] Int. Cl.³ ............................................. B63B 1/34
[52] U.S. Cl. .................................... 114/67 A; 114/289
[58] Field of Search ................. 114/61, 67 R, 67 A, 114/125, 271, 274, 275, 288, 289, 290, 291

[56] References Cited

U.S. PATENT DOCUMENTS

| | | | |
|---|---|---|---|
| 1,656,411 | 1/1928 | Baldwin | 114/67 A |
| 2,984,200 | 5/1961 | Toussel | 114/67 R X |
| 3,689,953 | 9/1972 | Markakis | 114/125 X |
| 3,702,598 | 11/1972 | Szptyman | 114/67 A |
| 3,871,317 | 3/1975 | Szptyman | 114/67 R X |
| 4,046,217 | 9/1977 | magnuson | 114/67 R X |

FOREIGN PATENT DOCUMENTS

| | | | |
|---|---|---|---|
| 105182 | 11/1936 | Australia | 114/274 |
| 133985 | 6/1929 | Switzerland | 114/289 |
| 1264961 | 2/1972 | United Kingdom | 114/67 A |

*Primary Examiner*—Edward R. Kazenske
*Attorney, Agent, or Firm*—Wenderoth, Lind & Ponack

[57] ABSTRACT

A high-speed ship of the displacement hull type which is adapted to float in a raised position, with the waterline being at a lower position. Greater buoyancy is caused by high-pressure air being held between the bottom plating of the ship and the water flowing under the bottom plating thereby reducing the wave-making drag of the bow and thereby allowing for the ship to have increased capability.

9 Claims, 12 Drawing Figures

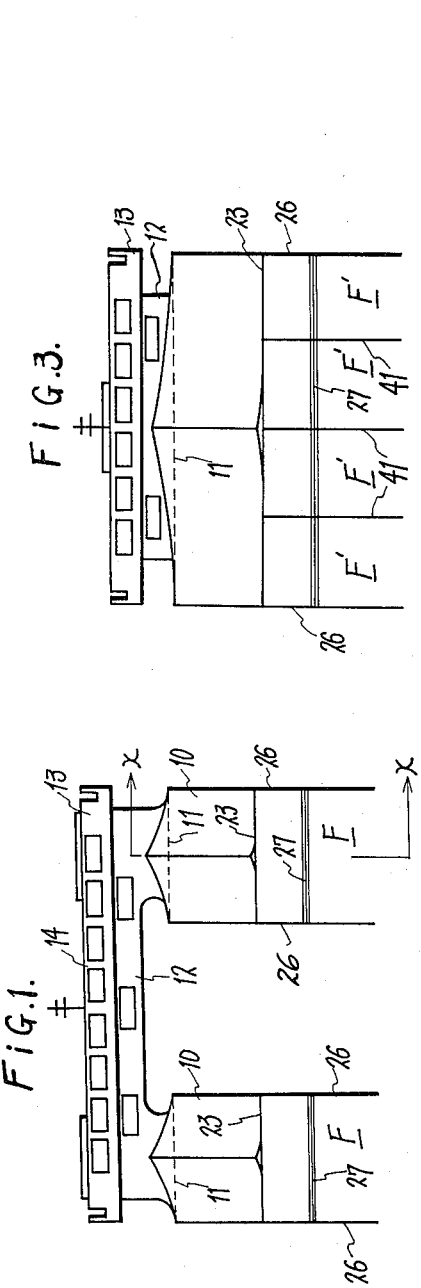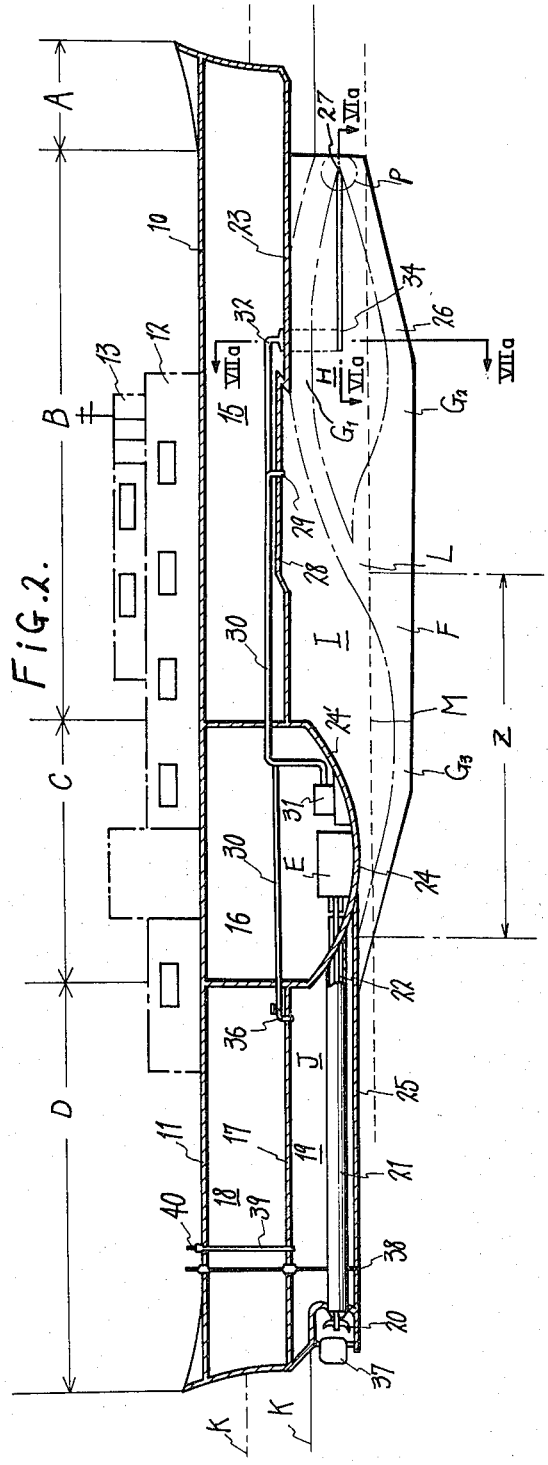

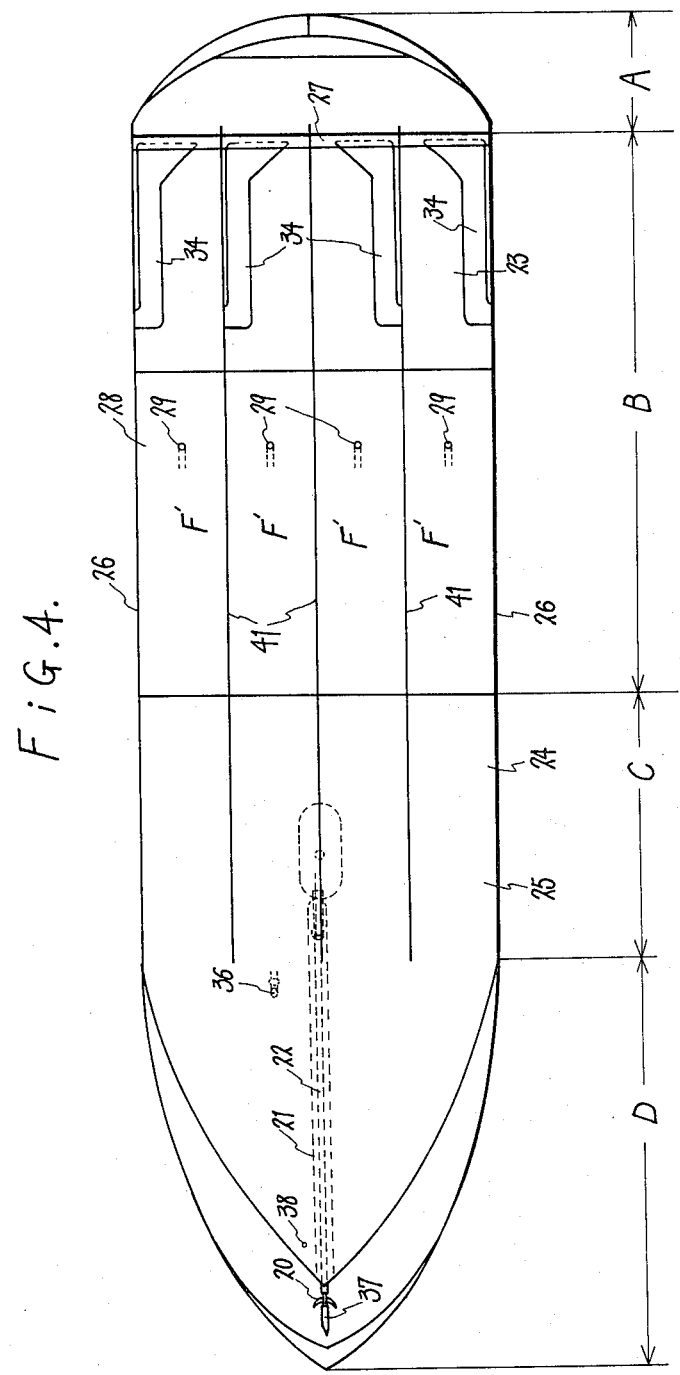

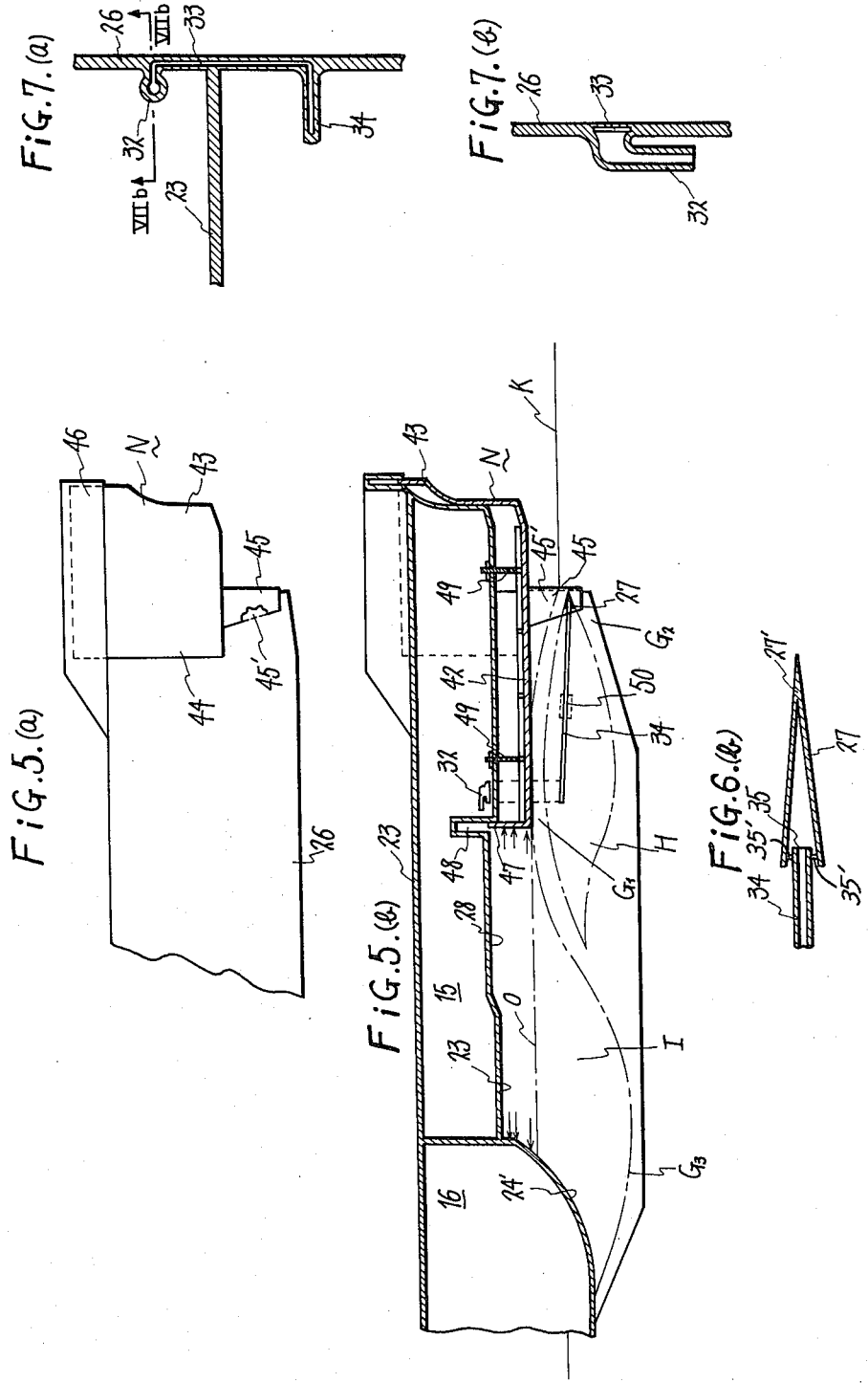

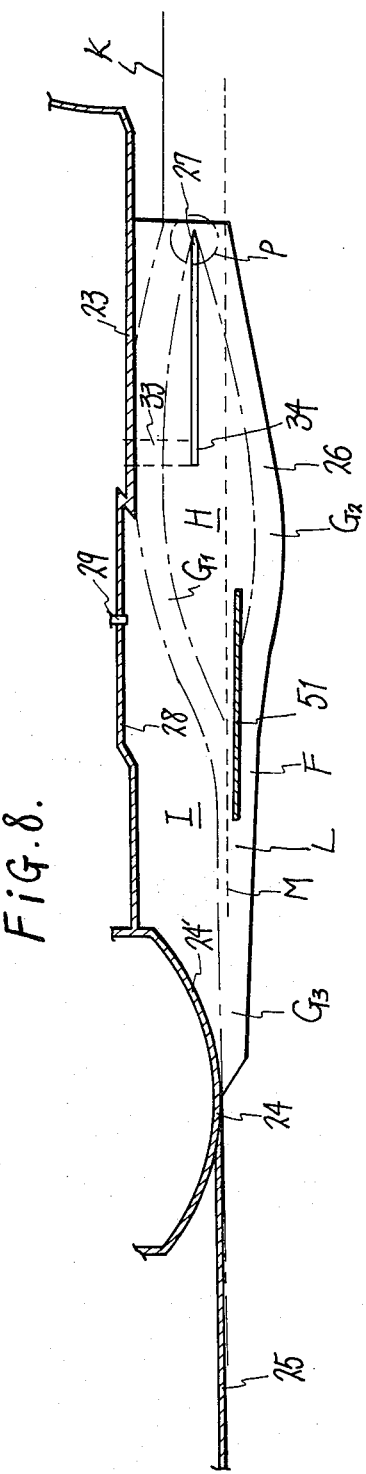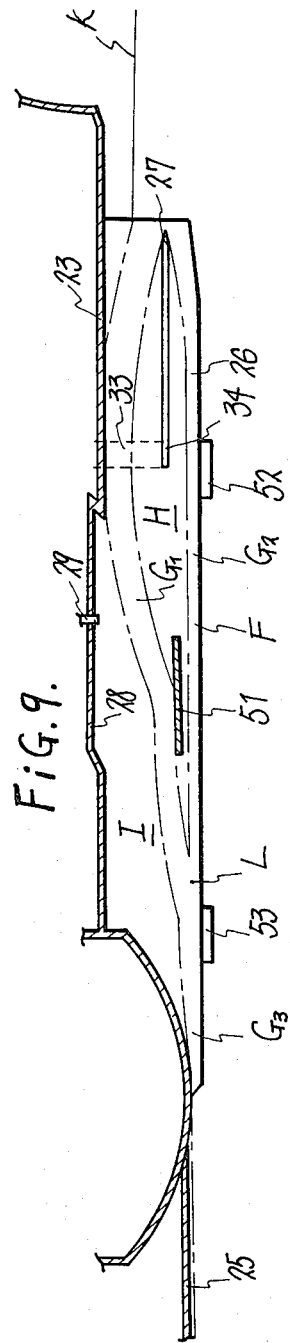

4,340,004

HIGH-SPEED SHIP

BACKGROUND OF THE INVENTION

This invention is directed to high-speed ships having a water displacement hull, and more particularly to a ship of this type which is adapted to easily increase its speed by reducing the wave-making drag caused by the bow during navigation this drag being what interferes most seriously with the speed capabilities of the ship.

Generally ships are divided largely into the water displacement type (those whose entire weight is supported by the buoyancy thereof during navigation) and the surface hull type (high-speed ships whose entire weight is supported by the lift resulting from the shape of the ship bottom and also from the ship's buoyancy). To increase the speed of navigation, the usual practice is to increase the thrust acting on the ship more particularly, the concept of using horsepower, or modifying the shape of the hull as by tapering the bow toward its front end so as to reduce the wave-making drag of the bow during the advance of the ship are used to add thrust to the ship.

However, engines of increased horsepower are large-sized, require a greater equipment cost, entail a higher fuel consumption and are generally less economical with no reduction in drag being achieved. Thus an increase in horsepower does not lead to a corresponding increase in speed while resulting in increased engine noise or vibration.

Improvements in the shape of the hull, such as the modification of the bow to a tapered form as described above, are the usual solutions and no attempts have been made to greatly modify the basic shape of the ship hull which is already known. With the drag of the bow still remaining as high with the original hull shape, the improvements, if made, fail to achieve any noticeable increase in the navigational speed.

SUMMARY OF THE INVENTION

The object of this invention is to increase the speed to ships of the water displacement hull type by providing air holding spaces under the bottom plating of the ship to keep the ship afloat through the increased buoyancy of the air thus retained and thereby greatly reduce the wave-making drag of the bow so that the ship can easily and reliably move at a higher speed.

According to the present invention, there is provided a ship having a higher front hull bottom plating and a lower rear hull bottom plating which are interconnected by an intermediate bottom plating which is shaped like a step. Side plates are secured to the opposite sides of the front hull bottom plating and extend downwardly vertically therefrom to a depth slightly lower than the rear hull bottom plating for defining a water flow passage during navigation. A water dividing bar is secured to, and extends transversely between the opposite side plates in the front portion of the flow passage to divide the flow of water through the passage into two streams, i.e. an upper stream and a lower stream, and to form a front high-pressure air holding space between the streams and an intermediate high-pressure air holding space between the front hull bottom plating and the upper stream. The buoyancy of the high-pressure air which is contained in these spaces keeps the front half of the ship raised in a position such that the waterline which is at a higher level on the bow when anchored, is lowered below the bow and more particularly, onto the side plates. The stern portion of the ship includes a ballast tank which serves as a rear high-pressure air holding space, so that the buoyancy of the high-pressure air held in the rear space holds the stern portion raised in balance with the front half of the ship.

BRIEF DESCRIPTION OF THE DRAWINGS

FIG. 1 is a schematic front view showing a catamaran hull embodying the present invention;

FIG. 2 is a view in section taken along the line x—x in FIG. 1 and showing the ship during navigation;

FIG. 3 is a schematic front view showing a ship having a single hull;

FIG. 4 is a bottom view of the single hull ship of FIG. 3;

FIG. 5 ($a$) is a fragmentary side elevation view sectioned in part and showing a bow cover attached to a ship;

FIG. 5 ($b$) is a vertical sectioned view showing the ship of FIG. 5 ($a$);

FIG. 6 ($b$) is an enlarged cross-section side view of the portion P in FIG. 2;

FIG. 7 ($a$) is an enlarged vertically sectioned view showing a side plate having an air channel shown along lines VII$a$ of FIG. 2;

FIG. 7 ($b$) is a cross section view from the top the side plates showing having an air channel connected to tube 32 taken along line VII($b$) of FIG. 7 ($a$); and FIGS. 8 and 9 are vertically sectioned views, each showing the principal part of another embodiment of this invention.

DETAILED DESCRIPTION OF THE INVENTION

Figure 6:
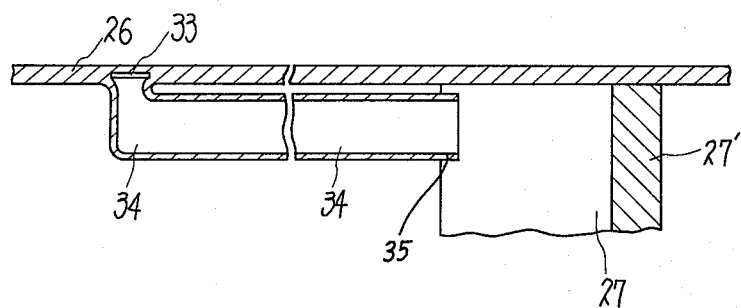
FIG. 6 ($a$) is a partial cross-section view, from the top, of a side plate, outlet and water dividing member shown in FIG. 2 at P taken along lines VI ($a$) of FIG. 2.

FIG. 1 shows one embodiment of the present invention as applied to a catamaran type ship having two hulls 10. The upper decks 11 of the hulls 10 are connected together at their center portions by a superstructure 14 which includes passenger compartments 12 in its lower portion and a bridge 13 in its upper portion.

Since the hulls 10 are of identical constructions, one hull alone will be described below with reference to FIGS. 1 and 2. The hull 10 comprises a bow portion A, a front hull portion B with its interior used as a cargo hold 15, a rear front hull portion C with its interior used as an engine room 16 and a stern portion D the interior of which is divided by an intermediate deck 17 into two, i.e. into an upper portion serving as a rear cargo hold 18 and a lower portion serving as a ballast tank 19 for containing water which can be discharged.

The bow portion A is tapered toward its front end. The hull portions B and C have generally the shape of a box. The stern portion D is tapered toward its rear end. The stern portion D has at a lower rear end portion, a propeller 20 which is coupled to an engine E which is located within the engine room 16, the propeller 20 is coupled by a drive shaft 22 which extends through a protective tube 21 which is secured in place within the ballast tank 19.

The bow portion A and the front hull portion B are provided with a front bottom plating 23 which has substantially a planar shape. The rear front hull portion C has an intermediate bottom plating 24 which is curved upward at its front and rear ends to substantially form a circular arc which is integral, at its lowermost portion, with a horizontal rear bottom plating 25 (see FIG. 2). Thus the front curved portion 24' of the intermediate bottom plating 24 connects the front bottom plating 23 which is at a higher level to the rear bottom plating 25 which is located at a lower level in a steplike fashion.

Side plates 26 are secured to the opposite sides of the front bottom plating 23, the intermediate bottom plating and the front portion of the rear bottom plating 25 (namely to the opposite sides of the section from the front hull portion B to the front part of the stern portion D). The side plates 26 extend vertically from opposite sides to a depth lower than the rear bottom plating 25 by a predetermined amount for preventing leakage of air from the high-pressure air holding spaces which are to be described later. The space defined by the opposite side plates serves as a water flow passage E during navigation.

A water dividing member 27 having a triangular cross section as seen in FIG. 6 is located at the front inlet end of the flow passage F and is secured to, and extends horizontally transversely between, the opposite side plates 26 with its apex 27' directed toward the front. The water flowing through the passage F during navigation is divided by the member 27 into an upper stream $G_1$ and a lower stream $G_2$. The front bottom plating 23 is formed having a water separating recess 28 extending transversely and parallel to the water dividing member 27. The water separating recess 28 has an air outlet 29 communicating through an air duct 30 with a compressor 31 which is provided within the engine room 16. The air outlet 29 discharges high-pressure air into the flow passage F to form an intermediate space I for holding a suitable quantity of high-pressure air between the front bottom plating 23 and the upper stream $G_1$.

The air duct 30 extends further toward the front and has a front end connected to a connecting tube 32 which is integrally formed on each of the side plates 26 above the bottom plating 23. There is an air channel 33 which extends down through and integrally within the side plates 26, the connecting tube 32 communicates with an air duct 34 through the channel 33, as shown in FIGS. 6 (a), 6 (b), 7 (a) and 7 (b), which is disposed within the flow passage F and is parallel to the side plate 26 (as shown enlarged in FIGS. 7(a) and 7(b)). The air duct 34 has at its forward end an air outlet 35 which extends into the rear end of the water dividing member 27 which is supported within member 27 by rods 35' (see FIG. 6). The air outlet 35 discharges high-pressure air for forming a front high-pressure air holding space H between the upper and lower streams $G_1$ and $G_2$. Further, as is clear from FIG. 6 (a), the air is discharged at outlet 35, collides against the walls of member 27, which includes the closed off apex 27', and flows rearward therefrom. The flowing water which is divided into upper and lower streams $G_1$ and $G_2$ cooperate with side plates 26 to define the boundaries of air pocket or holding space H.

The air duct 30 is divided and extends rearward and has at its rear end an air outlet 36 communicating with the ballast tank 19. The high-pressure air discharged from the outlet 36 provides a rear high-pressure air holding space J within the ballast tank 19. The rear air holding space J maintains the rear half portion of the ship in balance with the front half portion thereof which is raised by the front and intermediate air holding spaces H and I.

FIG. 2 shows a rudder 37, an opening 38 for maintaining the ballast tank 19 in communication with the body of water outside the ship for admitting or discharging water, and an air discharge pipe 39 provided with an air discharge valve 40 on its upper end projecting above the upper deck 11.

When the high-speed ship described above is anchored, the high-pressure air in the front and intermediate spaces H and I under the bottom plating and in the space J within the tank 19 is released, with water filling the flow passage F between the side plates 26 and the ballast tank 19. The waterline K is at its highest position with respect to the ship, as indicated by the dot-and-dash line in FIG. 2.

When the ship begins to advance, the water which flows through the passage F between the side plates 26 is divided by the member 27 into an upper stream $G_1$ and a lower stream $G_2$. At the same time, high-pressure air flows from the air outlet 35 thus creating a front high-pressure air holding space H behind dividing member 27, between the streams $G_1$ and $G_2$ and the plates 26, and an intermediate high-pressure air holding space I is also created from outlet 29 discharging air between the front bottom plating 23 and the upper stream $G_1$, and a rear high-pressure air holding space J which is created within the ballast tank 19 by air discharged from outlet 26. The high-pressure air in the spaces keeps the ship afloat at a raised level with increased buoyancy, with the waterline K lowered to a point below the bow portion A as shown by the solid line in FIG. 2, whereby the wave-making drag of the bow during the advance of the ship of the water displacement hull type is greatly reduced and this permits the ship to move easily at a higher speed.

The upper and lower streams $G_1$ and $G_2$ which are divided by the water dividing member 27 flow in the following manner. The upper stream $G_1$ flows upward because of the action of the air in the front space H, strikes the front bottom plating 23 and thereafter spontaneously drops off from the water separating recess 28. The lower stream $G_2$ which is divided off by the member 27 is forced down by the pressure of the air in the space H, rises again due to its restoring force and combines with the upper stream $G_1$ at a point L.

The combined stream $G_3$ is forced down first by the pressure of the falling upper stream $G_1$ and the pressure of the high-pressure air of the intermediate space I, and then is raised by its restoring force and flows rearward in contact with the rear bottom plating 25.

The upper stream $G_1$ prevents the air in the front space H from leaking toward the front through the space between the front bottom plating 23 and the waterline K. The combined stream $G_3$ prevents the air in the intermediate space I from leaking toward the rear through the space between the rear bottom plating 25 and the pressure line M of the high-pressure air (line representing the average of the water displacing air pressure).

The confluence point L of the upper and lower streams $G_1$ and $G_2$ is the point where the lower stream $G_2$ which is raised by the restoring force after flowing downward starts to flow down again. Accordingly the position at which the combined stream $G_3$ comes into contact with the rear bottom plating 25 is longitudinally adjustable with respect to the ship in accordance with the length of the ship, (i.e. with the distance between the water dividing member 27 and the intermediate bottom plating 24), by adjusting the pressure of air in the front and intermediate spaces H and I and thereby displacing the confluence point L longitudinally along the ship.

The high-speed ship of this invention having the basic construction described above may be outfitted with the usual interior equipment.

The water dividing member 27 is provided at an appropriate level within the flow passage F at its front end with the position where the upper stream $G_1$ strikes the front bottom plating 23, the angle at which the stream $G_1$ strikes the plating 23, the height of the waves on the sea, and the thickness of the upper stream $G_1$ being taken into account in positioning member 27. Thus the water dividing member 27 is disposed at such a position that the upper stream $G_1$, upon striking the front bottom plating 23, will not produce turbulence or eddy currents which would interfere with the advance of the ship and the high-pressure air will not be allowed to escape toward the front from the front space H under any condition.

The water separating recess 28 is formed at the position where the upper stream $G_1$ starts to flow down after striking the front bottom plating 23.

The pressure of the air in the spaces H, I and J is adjusted to be at a specific level at all times by a pressure-sensitive automatically opening and closing valve (not shown) which is provided at the air outlets 29, 35 and 36. Accordingly when the ship pitches or rolls due to varying wave heights or wave lengths and thereby produces a pressure drop or buildup in one or all of the spaces H, I and J due to air leakage or wave pressure, the valve or valves operate to supply or release air and thereby prevent the ship from pitching or rolling.

The present invention described above has the following advantages.

(a) The high-pressure air held under the bottom plating produces a buoyancy by which the hull is kept afloat at a raised level with its waterline thus lowered, thereby reducing the wave-making drag usually acting on the bow and thereby facilitating the speeding up of the ship.

(b) The high-pressure air which is held within the water flow passage F during navigation, the passage being defined by the side plates 26 on the opposite sides of the front bottom plating 23, can be confined in place and prevented from escaping transversely from the ship. While the waterline is held, by the air, at a level below the bow portion A (namely on the side plates 26), the ship is therefore subject to little or no wave-making drag and can therefore travel at a higher speed and with greater ease since the side plates 26 are parallel to the direction of advance of the ship.

(c) The water dividing member 27, provided within the flow passage F at its front end, divides the water flowing through the passage during navigation into an upper stream $G_1$ and a lower stream $G_2$ with the front high-pressure air holding space H formed between the two streams, so that the upper stream $G_1$ completely prevents the air from escaping from the front space H out the front and out through the space between the front bottom plating 23 and the waterline K.

(d) The lower stream $G_2$ which is divided by the member 27 as described above, is forced down by the pressure of the air in the front space H, rises again due to its restoring force and combines with the upper stream $G_1$ at a confluence point L at the rear end of the front air space 23 while the upper stream $G_1$ flows downward after striking the front bottom plating 23. The combined stream $G_3$ which is forced down by the falling pressure of the upper stream $G_1$ and the pressure of the high-pressure air of the intermediate space I, is then raised by its restoring force and thereafter flows rearward in contact with the rear bottom plating 25. Consequently the combined stream $G_3$ completely prevents the air in the intermediate space I from leaking out through the rear.

(e) The internal pressure of the front and intermediate spaces H and I, when suitably adjusted, controls the degree of fall of the lower stream $G_2$ or combined stream $G_3$, with the result being that the confluence point L and the position where the combined stream $G_3$ comes into contact with the rear bottom plating 25 are displaceable longitudinally along the ship in accordance with the length of the ship.

(f) The rear high-pressure air holding space I, which is provided within the ballast tank 19, maintains the ship in longitudinal balance.

(g) When the internal pressure of the front and intermediate spaces H and I is set at such a high level that the air pressure line M is lower than the intermediate bottom plating 24 as shown in FIG. 2, the front and intermediate air holding spaces H and I enlarge, giving a greater buoyancy to the ship, whereas the rearward pressure of the air in the intermediate space I to impede the advance of the ship does not increase to any great extent since the intermediate bottom plating 24 has a definite front curved surface 24'. Thus the force acting against the advance of the ship is relatively small with regard to the enlarged intermediate air space I. Since the front and intermediate air spaces H and I have an increased capacity in this case, it is preferable that the front bottom plating 23 have an increased length to provide a front cargo hold 15 with a greater capacity, with the passenger compartments 12 being positioned toward the front.

An embodiment of this invention has been described above for illustrative purposes only. The invention can have another embodiment as will be described below.

FIGS. 3 and 4 show another embodiment showing a single hull type ship. The front bottom plating 23 of the ship is provided on opposite sides thereof with side plates 26 extending from the plating 23 to the front portion of the rear bottom plating 25. Similarly partitions 41 are of identical shape and area with the side plates 26 which are fixedly provided vertically and parallel to the side plates 26, whereby the water flow passage F which is defined by the side plates 26 is divided. Each of the divisions F' of the passage is provided with an air outlet 29, connecting tube 32, air duct 34 and air outlet 35.

Thus, front and intermediate high-pressure air holding spaces H and I are formed within each division F' during navigation, with air leakage being prevented even when the ship rolls. Provision of the partitions 41 for dividing the flow passage F is not limited to ships of the single hull type but is also useful in ships of the catamaran type such as the one previously described. The interior of the ballast tank 19 may be provided with partitions for dividing the tank for forming a divided rear high-pressure holding space J.

In either of the single-hull or two-hull type ships, there may be great differences between the displacement of water of a fully loaded ship and that of the ship when it is unloaded, such that when the ship advances without any load, the front bottom plating 23 is positioned at too great a height from the water level K. It would then become impossible or difficult for the water dividing member 27 to divide the flow of water. Another problem that is likely to occur is that the resulting increase of the intermediate air holding space I creates a rearward force acting opposite to the advance of the ship. According to this invention, these objections can be overcome by fitting a vertically adjustable bow cover N to the bow A of the ship as shown in FIG. 5 (a) and FIG. 5 (b).

With reference to FIG. 5 (b), a horizontal plate 42 of specified length is vertically slidably provided between the side plates 26 at the front end portions. The horizontal plate 42 projects forward from the front ends of the side plates 26. The forward projection of the plate 42 is secured to a cover member 43 having a similar shape to the bow portion and covering the front part and side parts of the bow portion A, whereby the cover N is formed. The cover member 43 of the bow cover N includes opposite side walls 44. A folded vertical plate 45 is positioned closer to the rear end than to the front of each side wall 44 and extends from the lower edge of the wall 44. The front end of the side plate 26 is fitted in the folded portion of the vertical plate 45. A water dividing member 27 having a triangular cross section similar to the member 27 in the embodiment of FIG. 1 is secured to, and extends transversely between, the inner walls 45' of the opposed vertical plates 45, the apex of the member 27 being directed toward the front. The upper edge portion of the cover member 43 is vertically movably fitted in a folded portion 46 which is located at the upper edge of the bow portion A.

A transverse plate 47 extending upward from the rear end of the horizontal plate 42 is vertically slidably fitted into a lateral groove 48 which is located in the front bottom plating 23 and positioned in the water separating recess 28 at its front end.

A plurality of vertical lift rods 49 are fixedly implanted in the upper surface of the horizontal plate 42. The lift rods 49 project through the front bottom plating 23 into the hull, and the projecting ends are coupled to the same drive means such as a hydraulic piston-and-cylinder means, whereby the lift rods 49 are vertically adjustable.

Accordingly the bow cover N is slidingly movable upward or downward for adjustment by means of the lift rods 49. When the ship is empty, the bow cover N is held at a lowered position to position the water dividing member 27 at a specified depth as seen in FIG. 5 (b), so that the upper stream $G_1$ which is divided off by the member 27 effectively prevents air from escaping from the front space H and out through the front.

With the arrangement described, part of the rearwardly acting air pressure in the space I is offset by the forward pressure thereof acting on the transverse plate 47 at the rear end of the bow cover N. Thus the rearward pressure of the air acting against the advance of the ship is reduced by an amount corresponding to the air volume above the dot-and-dash line O in FIG. 5 (b) and beneath the front bottom plating 23.

Needless to say, the portion where the transverse plate 47 fits in the lateral groove 48 and the portions where the front ends of the side plates 26 fit in the folded portions of the vertical plates 45 are airtight. The air duct 34 is connected to the water dividing member 27 by a connecting tube 50 which is elastic and moves according to the upward or downward movement of the member 27.

When the rear portion of the ship, more particularly the rear bottom plating 25 as shown in FIG. 2 is shaped to have an increased length, the intermediate bottom plating 24 and the rear bottom plating 25 are positioned at a lower level at the hull rear portion C and stern portion D for increasing the water displacement of the ship's rear portion thereby increasing the total buoyancy.

FIG. 8 shows a flow regulating plate 51 being provided within the flow passage F between the side plates 26 for receiving the upper stream $G_1$ with the upper surface of the plate 51 and the lower stream $G_2$ within the lower surface thereof for causing the upper and lower streams to combine with each other at the rear of the plate 51. In this embodiment, the upper and lower streams $G_1$ and $G_2$ are regulated by the plate 51 first, and thereafter combined, and the combined stream $G_3$ flows rearward in a substantially horizontal path as seen in FIG. 8, unlike the upper and lower streams in the embodiment of FIGS. 1 and 2 in which they are directly combined. The embodiment shown in FIG. 2 shows the distance over which the combined stream $G_3$ (i.e. the distance Z as shown in FIG. 2) flows downward and is then raised by the bottom plate 25. This distance can be shortened by providing the flow regulating plate 51, as shown in FIG. 8, which allows for a shorter hull and results in the flow stream rising at an earlier point along the bottom. The front end of the flow regulating plate 51 extends into the front high-pressure air holding space H and thereby does not increase the resistance of the water during the advance of the ship.

In addition to the flow regulating plate 51, flow regulating plate 52 and 53 may be disposed within the flow passage F to regulate the lower stream $G_2$ and the combined stream $G_3$ as illustrated in FIG. 9.

Briefly, according to the present invention, front and intermediate high-pressure air holding spaces H and I are formed under the front bottom plating 23 during the advance of the ship, with a rear high-pressure air holding space J are provided in the ballast tank in the hull stern position, to maintain the ship in a raised level with its waterline lowered below the bow portion A, i.e. to the side plates 26, whereby the wave-making drag of the ship during navigation is minimized. This readily affords an increased navigation speed which has not been shown by the prior art.

What is claimed is:

1. A modified hull for a high speed ship, reducing drag and enabling travel at increased speeds, said ship's hull comprising:
    a front bottom plating;
    a rear bottom plating positioned at a lower level relative to the waterline of the hull than said front bottom plating;
    an intermediate bottom plating connecting said front and rear bottom platings;
    side plates which are secured to opposite sides of said front bottom plating, said side plates extending vertically downward therefrom to a position slightly lower than said rear bottom plating, said side plates cooperating for forming a water flow passage therebetween;
    a water dividing member which is secured to and extends transversely between said opposite side plates in the front portion of said flow passage for dividing the water flowing through said passage during navigation into an upper and a lower stream;

a compressor mounted within said hull; and an air duct extending throughout the length of and within said ship hull, said air duct being connected to said compressor, being supplied with compressed air, and having air supply outlets in the bottom of said ship hull along said front bottom plating and within the rear portion of said dividing member for creating a high pressure air front holding space between said upper and lower streams and an intermediate high pressure air holding space between said front bottom plating and said upper stream, and a ballast tank in a rear portion of said hull for dischargably containing water for keeping said ship in balance when the buoyance of said front portion of said hull is increased by air in and intermediate high pressure air holding spaces.

2. A high-speed ship hull as defined in claim 1 wherein said water dividing member has a triangular cross-section, said front bottom plating having a water separating recess in the lower surface thereof in which one of said air supply outlets for forming said intermediate high pressure air holding space is located, and wherein another of said air supply outlets is positioned in said ballast tank for controlling entry and discharge of water therefrom.

3. A high-speed ship hull as claimed in claim 1 further comprising at least one flow regulating plate secured to and transversely located between said opposite side plates.

4. A high-speed ship hull as claimed in claim 1 wherein said compressor is continuously adjustable for varying said air being supplied for creating a high-pressure air pocket in said high-pressure air front holding space, said air pocket having a shape for causing said upper stream to rise first, hit said front bottom plating and subsequently descent rearwardly, simultaneously said lower stream being caused to descend and subsequently rise due to its restoring force for combining with said upper stream at a confluence point for creating a single stream, said air pressure in said intermediate high-pressure air holding space being adjusted by said compressor for causing said single stream to drop and subsequently rise due to its restoring force and said rear bottom plating of said hull being positioned for causing said single stream to flow rearward in contact therewith.

5. A high-speed ship hull as claimed in claim 4 wherein said compressor is continuously adjustable for varying said air-pressure being supplied by said compressor to said front and intermediate high-pressure air holding spaces for displacing said confluence point of said two streams longitudinally along the bottom of said ship hull.

6. A high-speed ship hull as claimed in claim 1 wherein said hull comprises a single hull.

7. A high-speed ship hull as claimed in claim 6 further comprising a plurality of partitions having a shape identical to said side plates, said partitions being disposed parallel to said side plates for dividing said flow passage and each of said flow passage divisions being provided with air supply outlets.

8. A high-speed ship hull as claimed in claim 1 wherein said hull further comprises a bow cover attached to the bow of said ship hull, said bow cover being vertically adjustable.

9. A bow cover for reducing drag of a high-speed ship, a front bottom plating, a rear bottom plating positioned at a lower level relative to the waterline of the ship's hull than said front bottom plating, an intermediate bottom plating connecting said front and rear bottom platings, side plates secured to opposite sides of said front bottom plating, said side plates extending vertically downward therefrom to a position slightly lower than said rear bottom plating, said side plates cooperating for forming a water flow passage therebetween, a water dividing member located between said opposite side plates in the front portion of said flow passage for dividing the water flowing through said passage during navigation into an upper and a lower stream, an air duct system extending throughout the length of and within said ship hull for supplying compressed air to air supply outlets in the bottom of said ship hull along said front bottom plating and within the rear portion of said dividing member for creating a high pressure air front holding space between said upper and lower streams and an intermediate high pressure air holding space between said front bottom plating and said upper stream, and a ballast tank in a rear portion of said hull for balancing said ship when the buoyance of a front portion of said hull is increased by air in said front and intermediate high pressure holding spaces, said bow cover comprising:

a vertically movable horizontal plate positioned within said flow passage and between said opposite side plates, said vertically movable horizontal plate projecting forward from said side plates;

a transverse plate transversely mounted at the rear of said horizontal plate;

a cover member shaped like the bow portion of said hull being secured to the front of said horizontal plate, said bow portion having sidewall receiving recesses therein and said cover member having side wall portions with the upper edge portion of said side wall portions being vertically movably received in said recesses, each of said side wall portions further having, at the lower edge thereof, a vertical plate having a plate receiving recess for receiving the front end of a corresponding side plate therein, said water dividing member being secured to and extending transversely horizontally between said side wall portions of said cover member and said horizontal plate having a plurality of lift rods for vertically moving said horizontal plate and cover member together.

* * * * *